Nov. 10, 1959  E. C. McRAE  2,911,961
ENGINE ACCESSORY DRIVE
Filed Aug. 4, 1958  4 Sheets-Sheet 1

E. C. McRAE
INVENTOR.

BY J. R. Faulkner
L. H. Oster
K. L. Jerschling
ATTORNEYS

Nov. 10, 1959  E. C. McRAE  2,911,961
ENGINE ACCESSORY DRIVE
Filed Aug. 4, 1958  4 Sheets-Sheet 2

E. C. McRAE
INVENTOR.

BY J. R. Faulkner
J. H. Oster
K. L. Zerschling
ATTORNEYS

Nov. 10, 1959

E. C. McRAE 2,911,961

ENGINE ACCESSORY DRIVE

Filed Aug. 4, 1958

E. C. McRAE
INVENTOR.

BY

ATTORNEYS

Nov. 10, 1959 E. C. McRAE 2,911,961
ENGINE ACCESSORY DRIVE
Filed Aug. 4, 1958 4 Sheets-Sheet 4

E. C. McRAE
INVENTOR.

BY J. R. Faulkner
G. H. Oster
K. L. Zerschling
ATTORNEYS

United States Patent Office 2,911,961
Patented Nov. 10, 1959

2,911,961

ENGINE ACCESSORY DRIVE

Edwin C. McRae, Dearborn, Mich., assignor to Ford Motor Company, Dearborn, Mich., a corporation of Delaware Application August 4, 1958, Serial No. 753,058

13 Claims. (Cl. 123—41.11)

This invention relates to an engine accessory drive and more particularly to an engine accessory drive which is capable of driving engine accessories at two distinct speed ratios. The invention of this application is intended as an improvement over the invention of my copending application Serial No. 756,063 filed August 18, 1958, which is a continuation of application Serial No. 614,446, filed October 8, 1956, now abandoned.

The present invention provides a two speed engine accessory drive which is capable of driving all of the engine accessories commonly employed in automotive vehicles, i.e., a fan and water pump, a generator, an air conditioner compressor and a power steering pump, at two distinct speed ratios with respect to a driven shaft of the engine. The advantages of such an arrangement have been carefully discussed in the copending application mentioned above.

In the present invention, two driving members of different diameters are rotatably mounted on a driven shaft of the engine and means are provided to selectively couple the two driving members with the driven shaft. A friction clutch is provided to couple the larger of the driving members with the driven shaft while an overrunning clutch is provided to couple the smaller of the driving members to said driven shaft when the friction clutch is disengaged.

Suitable driving means, preferably in the form of belts, connect both of said driving members with the accessories of the engine so that the accessories will be driven by whichever of said driving members is then coupled to the driven shaft of the engine.

At engine speeds below a selected value, for example 2000 r.p.m., the friction clutch is engaged thereby coupling the larger driving member with the driven shaft. Consequently, all of the accessories are driven at a fixed speed ratio with respect to the driven shaft and the smaller driving member is driven at a speed higher than the speed of the driven shaft so that it overruns the driven shaft through the medium of the overrunning clutch.

When the speed of the driven shaft reaches this selected value, the friction clutch is disengaged by the force of a fluid under pressure acting on an annular piston surrounding the driven shaft. A centrifugally actuated valve is interposed in a conduit between the source of the fluid under pressure and the annular piston. This valve closes the conduit at speeds below the selected value and opens the conduit to permit fluid under pressure to act on said annular piston at speeds above said selected value. This valve is biased to the closed position by means of a spring which has a spring rate such that the increase in spring force for a given increment of outward movement of the valve is less than the increase in centrifugal force due to the increase in radius caused by the increment of valve movement. This insures positive valve operation since at the moment the valve starts to open it will immediately move to its full open position due to the increased outward force differential.

When the friction clutch is disengaged, all of the accessories and the two driving members start to slow down. When the speed of the smaller driving member falls to the speed of the driven shaft, the driven shaft drives the smaller driving member through the overrunning clutch. All of the accessories are now driven at a lower speed ratio with respect to the driven shaft.

When the speed of the driven shaft is reduced to about 1800 r.p.m. the centrifugal valve closes, the friction clutch is engaged, and the accessories are driven at a higher speed ratio through the first and larger driving member. The engagement of the friction clutch takes place over a finite time interval, for example 0.1 sec. to reduce the shock loads on the belts and the accessories and to prevent the belts from squealing. This is accomplished by controlling the rate at which the fluid leaves the chamber housing the annular piston. In addition, means for gradually transmitting increasing amounts of torque as the clutch is engaged are provided. This preferably takes the form of a lined sinuous clutch plate.

As noted, the embodiment of the invention shown uses a centrifugally operated clutch control valve but it will be apparent that a manually operated valve or one controlled by the position of the engine accelerator pedal may be used if desired.

An object of the present invention is the provision of an engine accessory drive which is capable of driving accessories at two distinct speed ratios with respect to the speed of a driven shaft of the engine.

A further object of the invention is the provision of a novel fluid actuated speed ratio changing device.

Another object is the provision of a fluid actuated speed ratio changing device including a positive acting centrifugal valve mechanism which will prevent the valve from hunting between the closed and open positions.

Still another object of the present invention is the provision of a unique belt drive arrangement which will drive the standard engine accessories with a minimum of belts.

A further object of the invention is the provision of means for gradually increasing the amount of torque transmitted by a friction clutch associated with said engine accessory drive as the clutch is being engaged, and the provision of means for controlling the rate at which the clutch engages.

Other objects and attendant advantages of the present invention will become more apparent as the specification is considered in connection with the accompanying drawings, in which.

Figure 1:
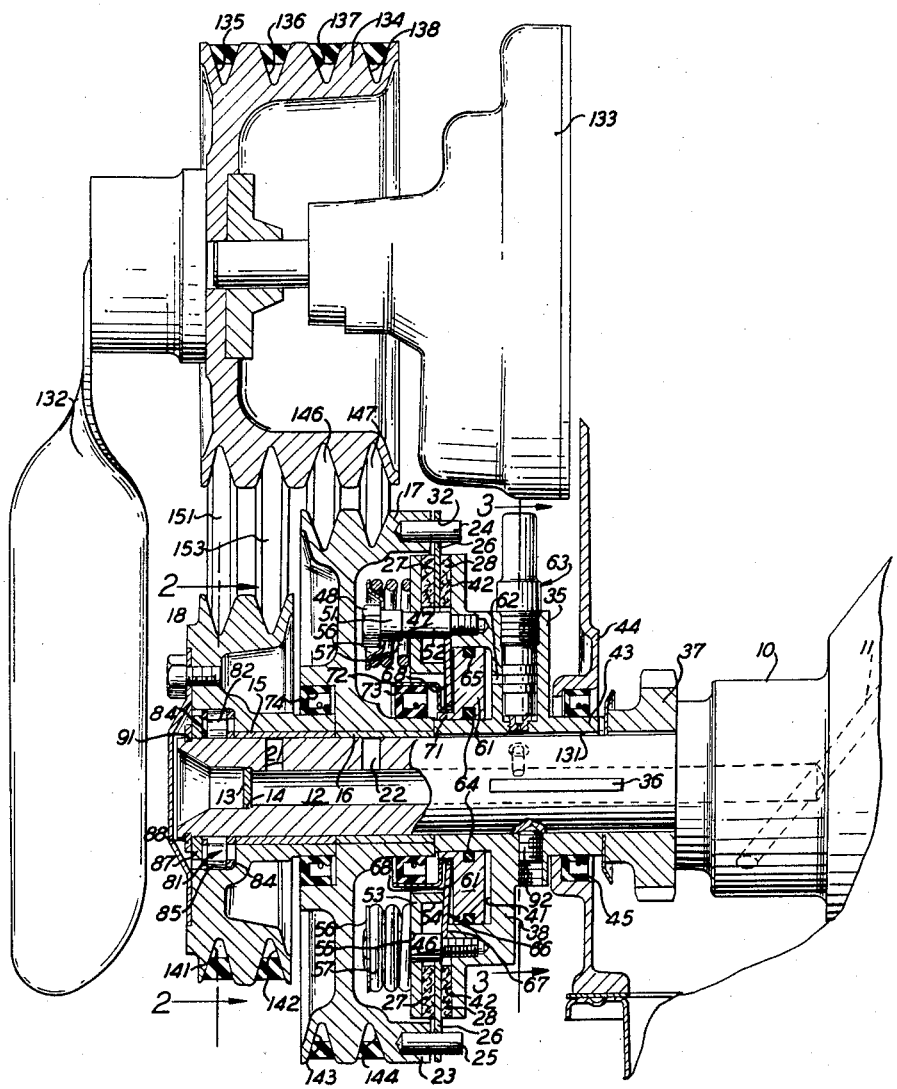
Figure 1 is a vertical sectional view through the front end of an engine having my improved accessory drive unit mounted thereon.

Referring now to the drawings in which like reference numerals designate like parts throughout the several views thereof, there is shown in Figure 1 a conventional automobile engine crankshaft generally designated by the numeral 10. Such shafts are ordinarily provided with drilled passageways for conducting oil under pressure from each of the main bearings to the crankpin bearings. One of such passageways is shown by dotted lines 11. The crankshaft employed with my improved drive is provided with a drilled passageway 12 which extends from the front of the crankshaft axially therethrough to intersect the passageway 11. Thus when the engine is being operated, oil under pressure will be conducted to the passageway 12. A plug 13 is positioned at the forward end of the crankshaft against an annular shoulder 14 to prevent the oil from escaping from the passage 12.

Rotatably mounted upon the crankshaft 10 by means of sleeve bearings 15 and 16 are a first speed driving pulley 17 and a second speed driving pulley 18 of smaller diameter than the first speed driving pulley. The sleeve bearings are lubricated by the engine lubricating oil through radial passageways 21 and 22 positioned in the crankshaft 10 to intersect the passageway 12.

Figures 5, 6, 7:
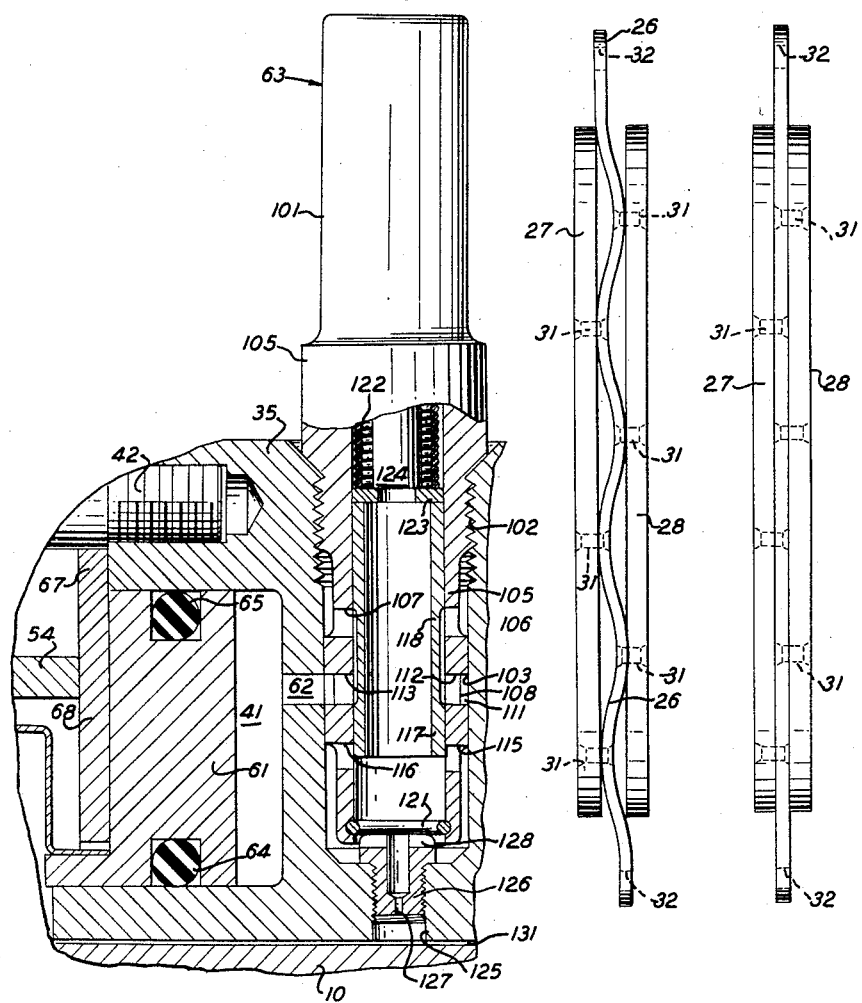
Figure 5 is a view similar to Figure 4 but showing the valve in its operative position.
Figure 6 is an elevational view of the friction clutch plate and linings shown in a position corresponding to the disengaged position of the clutch.
Figure 7 is a view similar to Figure 6 but showing the clutch plate and lining in a position corresponding to the engaged position of the clutch.

The first speed driving pulley 17 has a plurality of pins, two of which are shown at 24 and 25, affixed in axially extending bosses 23. A sinuous metallic clutch plate 26 having clutch linings 27 and 28 riveted to each side thereof by means of rivets 31, as shown in Figure 6, has a plurality of apertures 32 positioned around the circumference to receive the pins 24 and 25.

A clutch housing 35 is keyed to the crankshaft 10 by means of a key 36. This key also serves to fix a conventional timing gear 37 on the crankshaft. The housing 35 includes a main body portion 38 with an annular chamber 41 positioned therein, a radially extending clutch face 42 and an axial extending hub 43 which extends through the front face of the engine crankcase, a portion of which is shown at 44. A conventional oil seal 45 is provided between the hub 43 and the front face of the engine crankcase 44 to prevent engine oil from leaking from the crankcase around the hub 43.

A plurality of bolts, two of which are shown in Figure 1 at 46 and 47, are threaded into the main body portion 38 of the clutch housing 35. Although any reasonable number will suffice, it is preferred to provide six of these bolts equally spaced circumferentially around the main body portion. Each of the bolts is provided with a head 48, a first shank portion 51 and a second smaller shank portion 52. An annular clutch pressure plate 53 with an axially extending annular flange 54 at the inner circumference thereof is positioned over the second shank portion 52 of the bolts by means of a plurality of apertures 55 which are only slightly larger than the smaller shank portion 52 but are smaller in diameter than the larger shank portion 51. A spring retainer 56 is positioned over the heads 48 of each of the bolts and a compression spring 57 is positioned between each of the spring retainers and the pressure plate 53 to urge the clutch into engagement with the clutch plate.

An annular piston 61 is positioned in the annular chamber 41 of the clutch housing 35 and receives engine oil via port 62 from a centrifugal valve mechanism generally designated by the numeral 63. A pair of O-ring seals 64 and 65 are positioned in the piston 61 to provide an effective seal to prevent oil leakage past the piston.

Figure 4:
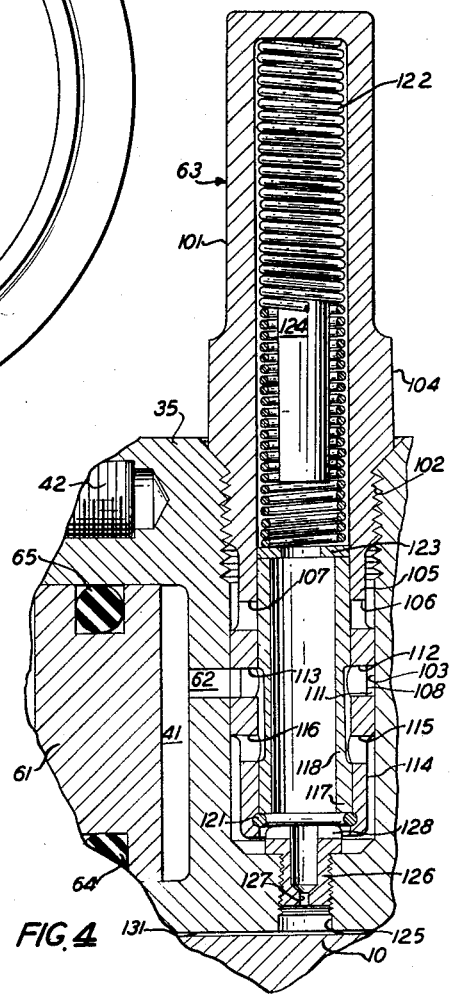
Figure 4 is an enlarged sectional view of the centrifugally actuated valve mechanism of the present invention showing the valve in its inoperative position.
Figure 9:
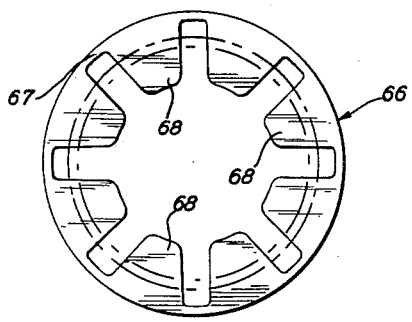
Figure 9 is a plan view of the annular spring plate employed in the invention.

During periods when the engine is not in operation and during periods when the engine speed is below a selected speed, for example 2000 r.p.m., the valve mechanism is inoperative and means are provided, which will be discussed in more detail below, to permit the oil in the annular chamber to drain back to the engine crankcase. An annular spring plate 66 having an outer circumferential rim member 67 with a plurality of fingers 68 extending radially inwardly therefrom is shown in plan view in Figure 9. The outer circumferential rim member 67 is positioned against an annular shoulder of clutch housing 35. The inboard edges of the fingers contact the face of the annular piston 61, while the axially inwardly extending flange 54 of the pressure plate 53 makes contact with the middle portion of the fingers as shown by the dotted lines in Figure 9. The force of the springs 57 is thus transmitted to the piston 61 through the flange 54 of the pressure plate 53 and the fingers of the annular spring plate 66 to force the annular piston into a rearward position as shown in Figures 1 and 4.

The annular piston 61 has a forwardly extending sleeve 71 to which is affixed an annular retainer 72 positioned in spaced relationship to the hub of the pulley 17. An oil seal 72 is positioned between the annular retainer and the hub of the pulley 17 and is adapted to slide axially on the hub of the pulley when the annular piston 61 reciprocates in the annular chamber 41. This oil seal and an oil seal 74, positioned between the two driving members 17 and 18, prevents the oil which is supplied to the sleeve bearings 15 and 16 from escaping.

Figure 2:
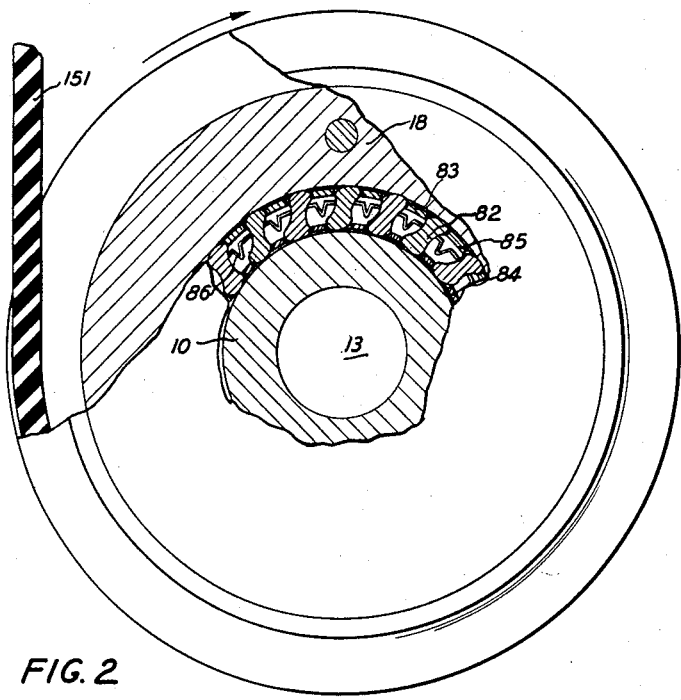
Figure 2 is a sectional view taken on the line 2—2 of Figure 1, with a portion thereof in elevation.

The second speed driving pulley 18 is adapted to be coupled to the crankshaft 10 by means of an overrunning clutch generally designated by the numeral 81. This clutch is housed in a suitable bore in the pulley 18. Although any suitable overrunning clutch mechanism, such as a roller clutch or a shoe type clutch may be employed, the sprag type clutch illustrated in Figures 1 and 2 is preferred. As best seen in Figure 2, the sprag type overrunning clutch comprises a plurality of sprags 82 each of which engages the crankshaft 10 and an internal shoulder 83 of the driving pulley 18. The sprags extend through an inner and an outer cylindrical shell designated by the numerals 84 and 85 respectively, and are biased into engagement with the crankshaft and the pulley 18 by means of a spring member 86. Referring now to Figure 1 a washer 87 is positioned over the crankshaft 10 and is in engagement with the inner and outer cylindrical shells 84 and 85 of the sprag type clutch. A snap ring 88 is positioned in a groove 91 in the shaft and against the washer 87 to properly position the pulley 18 axially on the shaft and to hold the overrunning clutch in the bore in the pulley. A set screw 92 is provided to secure the clutch housing 35 in proper axial position on the shaft, and this together with the snap ring 88 provides means for preventing excessive axial movement of the assembly, including the driving pulleys 17 and 18.

During engine operation, engine lubricating oil under pressure is supplied to the passageway 12. As can best be seen by reference to Figure 3, the oil under pressure is in turn supplied to the centrifugally actuated valve mechanism 63 through a radial passageway 94 in the crankshaft 10 and passageways 95 and 96 in the housing 35. The passageways 95 and 96 may be drilled in the housing 35 with the ends thereof closed off by suitable plugs 97 and 98.

Referring now to Figure 4, in which the valve mechanism 63 is shown in detail, it is apparent that the valve mechanism includes a main tubular body member 101 threadingly received in a threaded portion 102 of bore 103 positioned in the housing 35. The main tubular body member 101 is provided with a hexagonal portion 104 to permit the main body member to be securely tightened in the bore 103. This main tubular body portion is provided with a first portion of reduced diameter 105 so that the engine oil from passageway 96 fills an annular space around the periphery of the portion of reduced diameter. A pair of radially extending ports 106 and 107 are positioned at one end of this portion of reduced diameter. A second portion of reduced diameter 108 is provided on the main body member 101 of the valve mechanism to leave an annular chamber 111 in communication with the port 62 which leads to the annular chamber 41 behind the piston 61. This reduced portion also has a pair of radial ports 112 and 113 positioned therein. A third and final portion of reduced diameter 114 is provided at the innermost end of the valve mechanism main body member 101 and this portion is also provided with a pair of radial ports 115 and 116.

Figure 3:
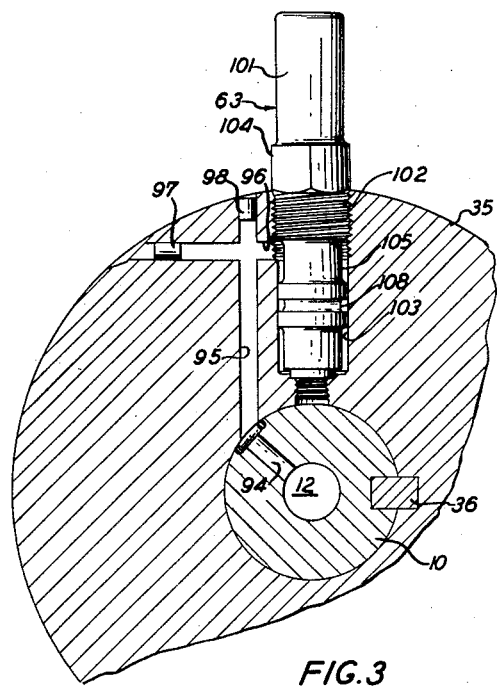
Figure 3 is a sectional view taken on the line 3—3 of Figure 1, and showing the valve mechanism in elevation.

A spool type sleeve valve 117 is provided with a portion of reduced diameter 118 of sufficient length to span the distance between two adjacent ports, that is the distance between ports 113 and 116 and ports 112 and 115 when the valve is in its innermost position as shown in Figure 3, and the distance between ports 107 and 113 and ports 106 and 112 when the valve is in its outermost position as shown in Figure 5. A snap ring 121 is retained in the open end of the main tubular body member to hold the spool valve in the valve body. The spool valve is urged against the snap ring by means of a helical spring 122 through a washer 123. The spring 122 is fitted over a cylindrical stop member 124 which limits the outward movement of the valve to the position shown in Figure 5. The outward movement of the valve is stopped when the washer 123 comes into engagement with the cylindrical stop member 124. In this position the reduced portion 118 of the valve 117 just spans the apertures 106 and 112 and the apertures 107 and 113.

Located in the clutch housing 35 at the bottom of the bore 103 is a second and smaller bore 125 which threadingly receives an orifice containing plug 126. This plug has a small orifice 127 positioned therein, for example .030 inch in diameter, and also has a transverse screw driver slot 128 therein so that the plug can be screwed into the bore. The crankshaft 10 is provided with an axial slot 131 in communication with the bore 125 and orifice 127 which, as shown in Figure 1, extends the full length of the housing 35.

Figure 8:
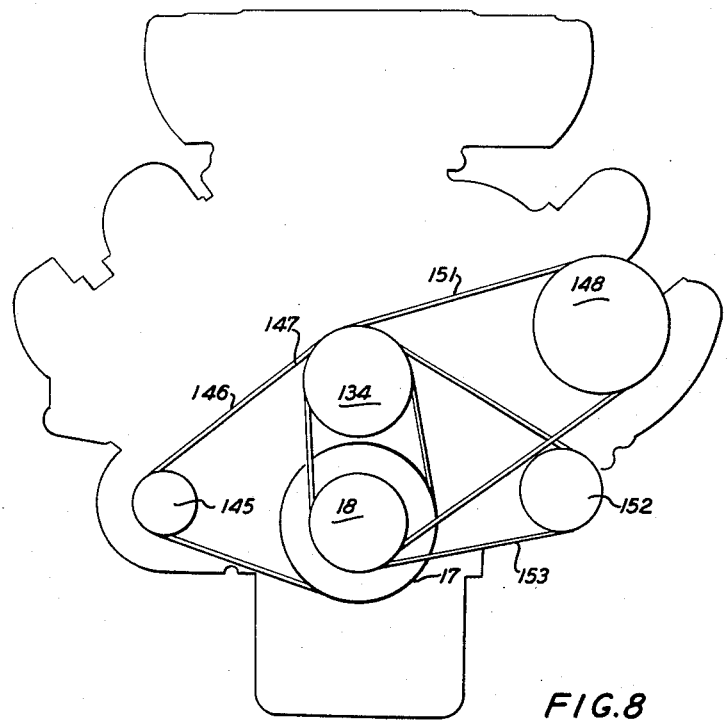
Figure 8 is a schematic view of the belt and pulley arrangement employed in the drive of the present invention.

Referring now to Figures 1 and 8, there is shown the arrangement of the accessories which are to be driven by either the driving pulley 17 or the driving pulley 18. Mounted above the crankshaft 10 I have provided a cooling fan 132 and a water pump 133 which are driven by a pulley 134 having four grooves 135, 136, 137 and 138 positioned therein. The two grooves 135 and 136 are positioned in axial alignment with two grooves 141 and 142 in the driving pulley 18 while the two grooves 137 and 138 are positioned in axial alignment with two grooves 143 and 144 in the driving pulley 17. At the left of the pulleys 17, 18 and 134 there is provided an accessory 145, for example, a generator, which is driven by a pulley with two grooves which are in axial alignment with the grooves 143 and 144 in the driving pulley 17. A pair of belts 146 and 147 extend around the driving pulley 17, the pulley 134 and the pulley driving the accessory 145. A second accessory 148, for example an air conditioning compressor, is positioned above and to the right of the driving pulleys 17 and 18 and the pulley 134. This accessory is driven by a single groove pulley which is axially aligned with the groove 141 in the driving pulley 18 and the groove 135 in the pulley 134. A belt 151 is positioned in the groove 141 in the driving pulley 18, the groove 135 in the pulley 134 and the single groove in the pulley driving the second accessory.

A third accessory 152, for example, a power steering pump, is positioned to the right of the driving pulleys 17 and 18 and the pulley 134 and below the second accessory 148. This accessory is driven by a pulley having a single groove which is axially aligned with the groove 142 in the driving pulley 18 and the groove 136 in the pulley 134. A belt 153 extends around the driving pulley 18, the pulley 134 and the pulley which drives the third accessory 152.

Although dual belts 146 and 147 are shown interconnecting the driving pulley 17, the pulley 134 which drives the fan 132 and the water pump 133 and the accessory 145, it is apparent that a single larger belt which would have the same torque transmitting properties as the dual belts may be employed.

When the engine crankshaft 10 is turning at speeds below 2000 r.p.m. the driving pulley 17 is coupled to the crankshaft through the friction clutch and the clutch housing 35. This pulley in turn drives the pulley 134, which is affixed to the fan 132 and the water pump 133, and the pulley affixed to the first accessory 145 through the medium of the belts 146 and 147. The second accessory 148 and the third accessory 152 are driven by the pulley 134 through the medium of belts 151 and 153, respectively. The driving pulley 18 while acting as an idler, is nevertheless driven by the belts 151 and 153 so that it helps drive the accessories 148 and 152. It is apparent that the driving pulley 18 will be rotating faster than the crankshaft 10 since the pulley 18 is smaller than the pulley 17 and both are connected to pulley 134. Both the crankshaft 10 and the pulley 18 rotate clockwise, in the direction of the arrow shown in Fig. 2, and since the pulley 18 is turning faster than the crankshaft 10, the overrunning clutch mechanism illustrated will permit the pulley to overrun the crankshaft.

At engine speeds below 2000 r.p.m., the valve 117 of the centrifugal valve mechanism 63 will be in the position shown in Figure 4 and the engine oil which is supplied to the annular chamber between the reduced portion 105 of the main tubular body member 101 and the bore 103 via passageways 12, 94, 95 and 96, is prevented from reaching the port 62 by means of the valve 117 which closes the ports 106 and 107. Thus the springs 57 force the clutch linings 27 and 28 which are affixed to the clutch plate 26 into engagement with the annular clutch member 53 and the clutch face 42 of the housing 35 respectively.

When the engine reaches 2000 r.p.m., the centrifugal force exerted on the valve 117 is sufficient to overcome the force exerted by the spring 122 and the valve moves to its operative position shown in Figure 5. The spring rate of the spring 122 is made low enough so that the increase in spring pressure for a given increment of outward movement of the valve is less than the increase in centrifugal force due to the increase in radius—measured from the center of the crankshaft 10 to the centroid of the valve 117—caused by the given increment of outward movement of the valve This provides a positive fast acting valve which will immediately move to the full open position the moment the centrifugal force on the valve 117 exceeds the force of the spring 122.

With the valve in the open position, as shown in Figure 5, engine oil under pressure flows from the passageway 12 through passageway 94 in the crankshaft 10, the passageways 95 and 96 in the housing 35 into the annular chamber between the reduced portion 105 of the tubular body member 101 and the bore 103 and through the ports 106 and 107. From there the oil flows between the main tubular body member 101 and the reduced portion 118 of the valve 117 to the ports 112 and 113 and thence into the annular chamber 41 behind the annular piston 61 via the port 62. The fluid pressure behind the annular piston 61 moves this piston to the left, into the position shown in Figure 5. This movement is transmitted to the pressure plate 53 against the force of the springs 57 by means of the fingers 68 of the annular spring plate 66 and the axially extending flange 54.

A force multiplying mechanism in the form of annular spring plate 66 is necessary to transmit the movement of annular piston 61 to the pressure plate 53 since the force exerted by the piston 61 acting alone is insufficient to overcome the force of the springs 57. The force exerted on the annular flange 54 of the pressure plate 53 by the fingers of the annular spring plate is greater than the force exerted on the ends thereof by the annular piston 61 since the lever arm from the circumferential rim 67, which is supported by the annular shoulder on the clutch housing 53, to the position where the annular flange 54 makes contact with the spring fingers is shorter than the distance from said circumferential rim to the ends of the spring fingers. Under normal operating conditions the annular piston 61 will move to the position shown in Fig. 5. In this position the annular spring member 66 has become flattened and the force of the piston 61 is transmitted directly to the annular flange through the fingers 68. When this position has been obtained, the force exerted on the annular flange 54 by the piston 61 is substantially equal to the force exerted by the springs 57 and therefore further movement to the left is prevented. However, under unusual circumstances the pressure of the fluid in the annular chamber 41 behind the annular piston 61 may be sufficient to overcome the force of the springs 57 when the piston is in the position shown in Figure 5. In this instance, the movement of the pressure plate 53 and the piston 61 to the left is limited by the shank 51 on the bolts 47.

The movement of the pressure plate 53 to the left permits disengagement of the clutch lining 27, thereby decoupling the driving pulley 17 from the crankshaft 10. When this happens, all the pulleys and accessories shown start to slow down and when the speed of the driving pulley 18 is reduced to the speed of the crankshaft 10, the overrunning clutch mechanism shown in Figure 2 couples the crankshaft with the pulley 18.

Thus the crankshaft 10 drives the driving pulley 18, and the driving pulley 17 is free to rotate slower than the crankshaft. The driving pulley 18 now drives the water pump and fan pulley 134 and the second accessory 148, the air conditioning compressor, through the medium of the belt 151, and drives the water pump and fan pulley 134 and the third accessory 152, the power steering pump, through the medium of the belt 153. The first accessory 145, the generator, is driven by the pulley 134 through the medium of belts 146 and 147 with the driving pulley 17 acting as an idler. Inasmuch as the driving pulley 18 is of smaller diameter than the driving pulley 17, all of the accessories will now be driven at a reduced speed ratio, with respect to the speed of the crankshaft 10.

When the engine speed is reduced below about 1800 r.p.m., the centrifugal force on the valve 117 of the centrifugal valve mechanism 63 will fall below the pressure exerted by the spring 122 and the valve will be immediately returned to its fully closed position shown in Figure 4. The low spring rate of the spring 122 insures positive inward movement of the valve 117 just as it insured positive outward movement of the valve. During inward movement of the valve 117 the decrease in centrifugal force due to the inward movement of the valve is greater than the decrease in the spring force due to the lengthening of the spring, therefore the moment the valve 117 starts to move inwardly, it is almost instantaneously forced all the way to the closed position against the snap ring 121. When the valve moves into the inward or closed position as shown in Figure 4, the ports 106 and 107 are closed by the valve 117 thus blocking communication between the fluid under pressure in the passageways 12, 95, and 96 and the annular chamber 41. With the valve in the closed position the fluid in chamber 41 is permitted to flow out through the port 62, through the ports 112 and 113, between the reduced portion 118 of the valve 117 and the main body member 101 of the valve mechanism, through ports 115 and 116 into the space between the reduced portion 114 of the main body member 101 of the valve mechanism and the walls of the bore 103. From there the fluid may flow between the plug 126 and the ring 121 into the bore above the orifice 127 then out through orifice 127 into the bore 125 and then along slot 131 in the crankshaft into the crankcase of the engine.

As previously stated, the clutch springs 57 exert a force on the pressure plate 53 which is transmitted to the annular piston 61 by means of the axially extending flange 54 and the fingers on the annular spring plate 66. Thus when the valve comes to the closed position, the fluid in the chamber 41 is forced into the crankcase of the engine through the path previously described and the annular piston moves from the left to the right thus permitting the friction clutch to engage thereby coupling the driving pulley 17 to the crankshaft 10. This will immediately increase the speed of the accessories since they are now being driven by the larger driving pulley 17 rather than the smaller driving pulley 18. If the friction clutch were permitted to engage instantaneously, heavy shock loads due to the inertia of all of the accessories would be placed upon the various structural members of the accessories and the accessory drive, and, in addition, undesirable noise in the form of belt squeal would be produced.

The present invention provides means for insuring smooth engagement of the friction clutch over a finite time interval. It will be seen that when the sinuous clutch plate 26 shown in Figure 6 is engaging, contact is first made at the apices of the clutch plate 26 where the rivets 31 are positioned. As the clutch continues to engage, the two clutch members 42 and 53 further compress the sinuous clutch plate 26 until it is completely flattened as pictured in Figure 7. This permits the clutch to gradually transmit an increasing amount of torque as the piston 61 moves toward the right. The orifice 127 controls the rate of movement of the annular piston 61 and hence the rate of engagement of the friction clutch by limiting the flow of fluid from the annular chamber 41 behind the annular piston to the engine crankcase to a preselected rate. It is considered that in a typical application the clutch should be engaged over a period of about 0.1 of a second and that an orifice a few thousandths in diameter, for example .030, would be appropriate. The size of the orifice can readily be changed to suit each application of the accessory drive of the present invention.

When the friction clutch engages, the driving pulley 17 is coupled to the shaft and drives the pulley 134 and the accessory 145 at an increased speed ratio. The pulley 134 drives the accessories 148 and 152 as well as the speed driving pulley 18 at this increased speed ratio, thus causing the pulley 18 to overrun the crankshaft 10 and act as an idler as previously mentioned.

Thus the present invention provides a compact reliable two speed accessory drive for the accessories of an automotive engine.

It will be understood that the invention is not to be limited to the exact construction shown and described, and that various changes and modifications may be made without departing from the spirit and scope of the invention as defined in the appended claims.

What is claimed is:

1. In a two speed engine accessory drive, a first speed driving member, a second speed driving member, said first and second speed driving members being each rotatably mounted for independent rotation on a driven shaft of said engine, a clutch housing fixed to said driven shaft, a clutch member associated with said housing to frictionally connect said first speed driving member to said driven shaft, an annular chamber in said housing, a piston in said chamber, conducting means for supplying fluid under pressure to said chamber, a valve interposed in said conducting means, means connecting said piston with said clutch member so that when said piston is moved outwardly in said chamber said clutch member is disengaged, means for moving said valve to its open position when said driven shaft is rotating above a preselected speed range, an overrunning clutch connecting said second speed driving member with said driven shaft, and a plurality of accessories connected to said driving members so as to be driven by either of said members.

2. In a two speed engine accessory drive, a first speed driving member, a second speed driving member, said first and second speed driving members being each rotatably mounted for independent rotation on a driven shaft of said engine, a clutch housing fixed to said driven shaft, a clutch member associated with said housing to frictionally connect said first speed driving member to said driven shaft, an annular chamber in said housing, a piston in said chamber, conducting means for supplying fluid under pressure to said chamber, a centrifugally actuated valve interposed in said conducting means, means connecting said piston with said clutch member so that when said piston is moved outwardly in said chamber said clutch member is disengaged, said centrifugally actuated valve moving to its open position when said driven shaft is rotating above a preselected speed range, an overrunning clutch connecting said second speed driving member with said driven shaft, and a plurality of accessories connected to said driving members so as to be driven by either of said members.

3. In a two speed engine accessory drive, a first speed driving member, a second speed driving member, said first and second speed driving members being each rotatably mounted for independent rotation on a driven shaft of said engine, a clutch housing fixed to said driven shaft, a clutch member associated with said housing to frictionally connect said first speed driving member to said driven shaft, an annular chamber in said housing, a piston in said chamber, conducting means for supplying fluid under pressure to said chamber, a centrifugally actuated valve interposed in said conducting means, a spring for urging said centrifugally actuated valve means into the inoperative position so that said conducting means for supplying fluid under pressure to said chamber is closed at relatively low speeds of said engine, means connecting said piston with said clutch member so that when said piston is moved outwardly in said chamber said clutch member is disengaged, said centrifugally actuated valve moving to its operative position to open said conducting means when said driven shaft is rotating above a preselected speed range, the spring rate of said spring being such that the increase in spring force for a given increment of outward movement of said valve is less than the increase in centrifugal force due to the increase in the distance between the centroid and the center of rotation of said valve caused by the given increment of outward movement of said valve, an overrunning clutch connecting said second speed driving member with said driven shaft, and a plurality of accessories connected to said driving members so as to be driven by either of said members.

4. In a two speed engine accessory drive, a first speed driving member, a second speed driving member, said first and said second speed driving members being each rotatably mounted for independent rotation on said driven shaft of said engine, a friction clutch arranged to operatively couple said first speed driving member with said driven shaft, an overrunning clutch arranged to operatively couple said second speed driving member with said driven shaft, a plurality of rotatable accessories connected to each of said speed driving members so as to be driven by either of said speed driving members, fluid actuated means for controlling the engagement of said friction clutch, means for conducting fluid under pressure to said actuating means, a centrifugally actuated valve interposed in said conducting means and driven in synchronism with said engine, said centrifugally actuated valve closing said conducting means at relatively low engine speeds, a spring for urging said valve to the closed position, said valve being moved outwardly by centrifugal force against the spring at a selected speed range of said engine to open said conducting means, the spring rate of said spring being such that the increase in spring force for a given increment of outward movement of said valve is less than the increase in centrifugal force due to the increase in distance between the centroid and the center of rotation of said valve caused by the given increment of outward movement of said valve.

5. In a two speed engine accessory drive, a first speed driving member, a second speed driving member, said first and second speed driving members being each rotatably mounted for independent rotation on a driven shaft of said engine, a friction clutch arranged to operatively couple said first speed driving member with said driven shaft, an overruning clutch coupling said second speed driving member with said driven shaft, a plurality of rotatable accessories connected to each of said driving members so as to be driven by either of said members, fluid actuating means for controlling the engagement of said friction clutch, said fluid actuating means comprising an annular chamber, and an annular piston positioned in said chamber, means for conducting fluid under pressure to said annular chamber, a centrifugally actuated valve interposed in said conducting means and driven in synchronism with said engine, said centrifugally actuated valve being closed at relatively low engine speeds thereby preventing said fluid under pressure from entering said annular chamber so that said friction clutch is engaged, said centrifugal actuating valve opening said conducting means at a selected engine speed to permit fluid under pressure to enter said annular chamber and move said annular piston, and means for transmitting the motion of said annular piston to the friction clutch to disengage said friction clutch.

6. In a two speed engine accessory drive, a speed driving pulley rotatably mounted in axial alignment with a driven shaft of said engine, a double speed driving pulley of smaller diameter than said first speed driving pulley mounted in axial alignment with said driven shaft, means for selectively coupling said pulleys to said driven shaft, a triple pulley mounted in position radially spaced from said driven shaft, a first accessory driving pulley rotatably mounted in position radially spaced from said pulleys, a second accessory driving pulley rotatably mounted in position radially spaced from said pulleys and said first accessory driving pulley, a third accessory driving pulley rotatably mounted in position radially spaced from said pulleys and from said first and said second accessory driving pulleys, a belt extending around said first speed driving pulley and said triple pulley and one of said accessory driving pulleys, a second belt extending around said double speed driving pulley and said triple pulley and another of said accessory driving pulleys, and a third belt extending around said double speed driving pulley and said triple pulley and another of said accessory driving pulleys.

7. In a two speed engine accessory drive, a first double speed driving pulley rotatably mounted in axial alignment with a driven shaft of said engine, a second double speed driving pulley of smaller diameter than said first double speed driving pulley mounted in axial alignment with said driven shaft, means for selectively coupling said double pulleys to said driven shaft, a quadruple pulley mounted in position radially spaced from said driven shaft, a double accessory driving pulley mounted in position radially spaced from said pulleys, a second accessory driving pulley mounted in position radially spaced from said pulleys and said double accessory driving pulley, a third accessory driving pulley rotatably mounted in position radially spaced from said pulleys and from said first and said second accessory driving pulleys, two belts extending around said first speed driving pulley and said quadruple pulley and said double accessory driving pulley, a belt extending around said second double speed driving pulley and said quadruple pulley and one of said accessory driving pulleys, and another belt extending around said second double speed driving pulley and said quadruple pulley and the other of said accessory driving pulleys.

8. In a two speed engine accessory drive, a first speed driving pulley mounted in axial alignment with a driven shaft of said engine and having at least one groove, a second speed driving pulley of smaller diameter than said first speed driving pulley mounted in axial alignment with said driven shaft and having two grooves, a pulley having at least three grooves mounted in position radially spaced from said driven shaft, a first accessory driving pulley having at least one groove mounted in alignment with the groove in said first speed driving pulley and with one of the grooves in the pulley having three grooves, a second accessory driving pulley mounted in alignment with one of the grooves of said second speed driving pulley and with another of the grooves of said pulley having three grooves, a third accessory driving pulley mounted in alignment with the other of the grooves in said second speed driving pulley and the other of the grooves in said pulley having three grooves, a belt extending around said first speed driving pulley and said pulley with the three grooves and said first accessory driving pulley, another belt extending around said second speed driving pulley and said pulley having the three grooves and said second accessory driving pulley and another belt extending around said second speed driving pulley and said pulley having the three grooves and said third accessory pulley.

9. In a two speed engine accessory drive, a first speed driving pulley, a second speed driving pulley, said first and second speed driving pulleys being each rotatably mounted for independent rotation on a driven shaft of said engine, a clutch housing fixed to said driven shaft, a clutch member associated with said housing to frictionally connect said first speed driving pulley to said driven shaft, an annular chamber in said housing, a piston in said chamber, conducting means for supplying fluid under pressure to said chamber, a valve interposed in said conducting means, means connecting said piston with said clutch member so that when said piston is moved outwardly in said chamber said clutch member is disengaged, means for moving said valve to its open position when said driven shaft is rotating above a preselected speed range, an overrunning clutch connecting said second speed driving pulley with said driven shaft, a pulley having three grooves rotatably mounted in position radially spaced from said driven shaft and said first and second speed driving pulleys, an accessory driving pulley rotatably mounted in a position radially spaced from said pulleys, a second accessory driving pulley rotatably mounted in position radially spaced from said pulleys and said first accessory driving pulley, a third accessory driving pulley rotatably mounted in position radially spaced from said pulleys and said first and said second accessory driving pulleys, a belt extending around said first speed driving pulley and said pulley having the three grooves and said first accessory driving pulley, a second belt extending around the second driving pulley and said pulley having the three grooves and said second accessory driving pulley, and a third belt extending around said second driving pulley, and said pulley having the three grooves and said third accessory driving pulley.

10. In a two speed engine accessory drive, a first speed driving pulley, a second speed driving pulley, said first and second speed driving pulleys being each rotatably mounted for independent rotation on a driven shaft of said engine, a clutch housing fixed to said driven shaft, a clutch member associated with said housing to frictionally connect said first speed driving pulley to said driven shaft, an annular chamber in said housing, a piston in said chamber, conducting means for supplying fluid under pressure to said chamber, a centrifugally actuated valve interposed in said conducting means, means connecting said piston with said clutch member so that when said piston is moved outwardly in said chamber said clutch member is disengaged, said valve moving to its open position when said driven shaft is rotating above a preselected speed range, an overrunning clutch connecting said second speed driving pulley with said driven shaft, a pulley having three grooves rotatably mounted in position radially spaced from said driven shaft and said first and second speed driving pulleys, an accessory driving pulley rotatably mounted in a position radially spaced from said pulleys, a second accessory driving pulley rotatably mounted in position radially spaced from said pulleys and said first accessory driving pulley, a third accessory driving pulley rotatably mounted in position radially spaced from said pulleys and said first and said second accessory driving pulleys, a belt extending around said first speed driving pulley and said pulley having the three grooves and said first accessory driving pulley, a second belt extending around the second driving pulley and said pulley having the three grooves and said second accessory driving pulley, and a third belt extending around said second driving pulley, and said pulley having the three grooves and said third accessory driving pulley.

11. In a two speed engine accessory drive, a first speed driving pulley, a second speed driving pulley, said first and second speed driving pulleys being each rotatably mounted for independent rotation on a driven shaft of said engine, a clutch housing fixed to said driven shaft, a clutch member associated with said housing to frictionally connect said first speed driving pulley to said driven shaft, an annular chamber in said housing, a piston in said chamber, conducting means for supplying fluid under pressure to said chamber, a centrifugally actuated valve interposed in said conducting means, a spring for urging said centrifugally actuated means into the inoperative position so that said means for conducting fluid under pressure to said chamber is closed at relatively low speeds of said engine, means connecting said piston with said clutch member so that when said piston is moved outwardly in said chamber said clutch member is disengaged, said centrifugally actuated valve moving to its operative position to open said conducting means when said driven shaft is rotating above a preselected speed range, the spring rate of said spring being such that the increase in spring force for a given increment of outward movement of said valve is less than the increase in centrifugal force due to the increase in the distance between the centroid and the center of rotation of said valve caused by the given increment of outward movement of said valve, an overrunning clutch connecting said second speed driving pulley with said driven shaft, a pulley having three grooves rotatably mounted in position radially spaced from said driven shaft and said first and said second speed driving pulleys, an accessory driving pulley rotatably mounted in a position radially spaced from said pulleys, a second accessory driving pulley rotatably mounted in position radially spaced from said pulleys and said first accessory driving pulley, a third accessory driving pulley rotatably mounted in position radially spaced from said pulleys and said first and said second accessory driving pulleys, a belt extending around said first speed driving pulley and said pulley having the three grooves and said first accessory driving pulley, a second belt extending around the second driving pulley and said pulley having the three grooves and said second accessory driving pulley, and a third belt extending around said second driving pulley, and said pulley having the three grooves and said third accessory driving pulley.

12. In a two speed engine accessory drive, a first speed driving member, a second speed driving member, said first and said second speed driving members being each rotatably mounted for independent rotation on a driven shaft of said engine, a clutch housing affixed to said driven shaft, a clutch member associated with said housing to frictionally connect said first speed driving member to said driven shaft, an annular chamber in said housing, a piston in said chamber, conducting means for supplying fluid under pressure to said chamber, a valve interposed in said conducting means, means connecting said piston with said clutch member so that when said piston is moved outwardly in said chamber said clutch member is disengaged, means for moving said valve to its open position when said driven shaft is rotating above a preselected speed range, an overrunning clutch connecting said second speed driving member with said driven shaft, means for controlling the time of engagement of said clutch member when the speed of said driven shaft falls below said preselected speed range and said valve is moved to its closed position, and a plurality of accessories connected to said driving members so as to be driven by either of said members.

13. In a two speed engine accessory drive, a first speed driving member, a second speed driving member, said first and said second speed driving members being each rotatably mounted for independent rotation on a driven shaft of said engine, a clutch housing affixed to said driven shaft, a clutch member associated with said housing to frictionally connect said first speed driving member to said driven shaft, an annular chamber in said housing, a piston in said chamber, conducting means for supplying fluid under pressure to said chamber, a valve interposed in said conducting means, means connecting said piston with said clutch member so that when said piston is moved outwardly in said chamber said clutch member is disengaged, means for moving said valve to its open position when said driven shaft is rotating above a preselected speed range, an overrunning clutch connecting said second speed driving member with said driven shaft, means for controlling the time of engagement of said clutch member when the speed of said driven shaft falls below said preselected speed range and said valve is moved to its closed position said means including means for limiting the flow of fluid from said annular chamber to a preselected rate, and a plurality of accessories connected to said driving members so as to be driven by either of said members.

No references cited.